US009059782B2

(12) United States Patent
Desai et al.

(10) Patent No.: US 9,059,782 B2
(45) Date of Patent: Jun. 16, 2015

(54) METHOD AND SYSTEM FOR ANTENNA AND RADIO FRONT-END TOPOLOGIES FOR A SYSTEM-ON-A-CHIP (SOC) DEVICE THAT COMBINES BLUETOOTH AND IEEE 802.11 B/G WLAN TECHNOLOGIES

(75) Inventors: Prasanna Desai, Encinitas, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1193 days.

(21) Appl. No.: 11/387,340

(22) Filed: Mar. 23, 2006

(65) Prior Publication Data

US 2007/0060055 A1 Mar. 15, 2007

Related U.S. Application Data

(60) Provisional application No. 60/686,482, filed on Jun. 1, 2005.

(51) Int. Cl.
*H04B 7/00* (2006.01)
*H04B 1/403* (2015.01)
*H04W 88/06* (2009.01)

(52) U.S. Cl.
CPC ............... *H04B 1/406* (2013.01); *H04W 88/06* (2013.01)

(58) Field of Classification Search
USPC ............... 455/41.2, 552.1, 553.1, 101, 575.7, 455/90.3, 132; 343/702, 872, 876; 370/334, 370/338, 339
See application file for complete search history.

(56) References Cited

U.S. PATENT DOCUMENTS 6,526,264 B2* 2/2003 Sugar et al. ...................... 455/84
7,046,649 B2* 5/2006 Awater et al. .................. 370/338
7,283,840 B2* 10/2007 Cho ............................. 455/552.1
7,382,756 B2* 6/2008 Barber et al. .................. 370/338
2002/0057726 A1* 5/2002 Williams et al. ............... 375/136
2003/0098806 A1* 5/2003 Green ............................ 341/144
2004/0022210 A1* 2/2004 Frank et al. .................... 370/328

(Continued)

FOREIGN PATENT DOCUMENTS

EP 1083622 * 3/2001 ............... H01Q 1/00

OTHER PUBLICATIONS

Nada Golmie, Nicolas Chevrollier and Olivier Rebala, *Bluetooth and WLAN Coexistence: Challenges and Solutions*, IEEE Wireless Communications, Dec. 2003, pp. 22-29.

(Continued)

*Primary Examiner* — Nay A Maung
*Assistant Examiner* — Angelica M Perez
(74) *Attorney, Agent, or Firm* — McDermott Will & Emery LLP

(57) ABSTRACT

Certain embodiments of the invention may be found in a method and system for antenna and radio front-end topologies for a system-on-a-chip (SOC) device that combines Bluetooth and IEEE 802.11 b/g WLAN technologies. A single chip radio device that supports WLAN and Bluetooth technologies receives a WLAN signal in a WLAN processing circuitry of the radio front-end and in a Bluetooth processing circuitry of the radio front-end. Signals generated by the WLAN processing circuitry and the Bluetooth processing circuitry from the received WLAN signal may be combined in a diversity combiner that utilizes selection diversity gain combining or maximal ratio combining (MRC). When a generated signal is below a threshold value, the signal may be dropped from the combining operation. A single antenna usage model may be utilized with the single chip radio device front-end topology to support WLAN and Bluetooth communications.

21 Claims, 12 Drawing Sheets

(56) References Cited

U.S. PATENT DOCUMENTS

2004/0180622 A1\* 9/2004 Godfrey ................ 455/41.2
2004/0258174 A1 12/2004 Shao et al.
2005/0208900 A1\* 9/2005 Karacaoglu ................ 455/78

OTHER PUBLICATIONS

*Draft Recommended Practice for Information Technology—Telecommunications and Information Exchange Between Systems—Local and Metropolitan Area Networks Specific Requirements, Part 15.2: Coexistence of Wireless Personal Area Networks with Other Wireless Devices Operating in Unlicensed Frequency Bands*, IEEE Standards Activities Department, Standard Licensing and Contracts, IEEE P802.15.2/Draft #05, Mar. 15, 2002, pp. 1-98.

Brian P. Crow, Indra Widjaja, Jeong Geun Kim, and Prescott T. Sakai, *IEEE 802.11 Wireless Local Area Networks*, IEEE Communications Magazine, Sep. 1997, pp. 116-126.

\* cited by examiner

METHOD AND SYSTEM FOR ANTENNA AND RADIO FRONT-END TOPOLOGIES FOR A SYSTEM-ON-A-CHIP (SOC) DEVICE THAT COMBINES BLUETOOTH AND IEEE 802.11 B/G WLAN TECHNOLOGIES

CROSS-REFERENCE TO RELATED APPLICATIONS/INCORPORATION BY REFERENCE

This patent application makes reference to, claims priority to and claims benefit from U.S. Provisional Patent Application Ser. No. 60/686,482, filed on Jun. 1, 2005.

This application makes reference to:
U.S. application Ser. No. 11/143,559 filed on Jun. 2, 2005;
U.S. application Ser. No. 11/143,378 filed on Jun. 2, 2005; and
U.S. application Ser. No. 11/387,309 filed on even date herewith.

The above referenced applications are hereby incorporated herein by reference in their entirety.

FIELD OF THE INVENTION

Certain embodiments of the invention relate to interference in communication systems. More specifically, certain embodiments of the invention relate to a method and system for antenna and radio front-end topologies for a system-on-a-chip (SOC) device that combines Bluetooth and IEEE 802.11b/g WLAN technologies.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the isolation between the Bluetooth radio front-end and the WLAN radio front-end may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79 1 MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desensitize the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensed by the Bluetooth transmission as the isolation between radios is reduced.

Other techniques may be based on collaborative coexistence mechanisms, such as those described in the IEEE 802.15.2-2003 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth radio device to determine whether Bluetooth communication is to occur. However, polling the Bluetooth radio device may have to be performed on a fairly constant basis and may detract the WLAN radio device from its own WLAN communication operations. If a polling window is utilized instead, where the polling window may be as long as several hundred microseconds, the WLAN radio device has adequate time available to poll the BT radio device, which may indicate that BT communication is to occur. In other instances, the collocated WLAN and Bluetooth radio devices may utilize an interrupt-driven arbitration approach. In this regard, considerable processing time may be necessary for handling the interrupt operation and to determine the appropriate communication schedule based on the priority and type of WLAN and Bluetooth packets.

As a result of the interference or collisions that may occur between collocated radio devices in a coexistence terminal, separate antennas or antenna arrays may be utilized for each protocol supported by the radio device. However, the use of additional antenna hardware may result, in some instances, in a costlier product, and may limit the size and/or form factor that may be achieved in, for example, a mobile terminal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for antenna and radio front-end topologies for a system-on-a-chip (SOC) device that combines Bluetooth and IEEE 802.11b/g WLAN technologies, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for antenna and radio front-end topologies for a system-on-a-chip (SOC) device that combines Bluetooth and IEEE 802.11b/g WLAN technologies. A single chip radio device that supports WLAN and Bluetooth technologies receives a WLAN signal in a WLAN processing circuitry of the radio front-end and in a Bluetooth processing circuitry of the radio front-end. Signals generated by the WLAN processing circuitry and the Bluetooth processing circuitry from the received WLAN signal may be combined in a diversity combiner that utilizes selection diversity gain combining or maximal ratio combining (MRC). When a generated signal is below a threshold value, the signal may be dropped from the combining operation. During a WLAN-only mode of operation, that is, when there is no collocated Bluetooth activity, utilizing both receive paths supported by the single chip radio front-end topology for WLAN signal reception may result in a better WLAN signal-to-noise ratio (SNR) or signal-to-interference-and-noise ratio (SINR) when communication occurs in faded multipath channels. In this regard, a better WLAN SNR or SINR may correspond to a larger range of operations for a WLAN-enabled device. Moreover, when size and/or form factor are of concern, a single antenna usage model that provides WLAN and Bluetooth collocated communications may also be supported by the single chip radio front-end topology.

Figure 1A:
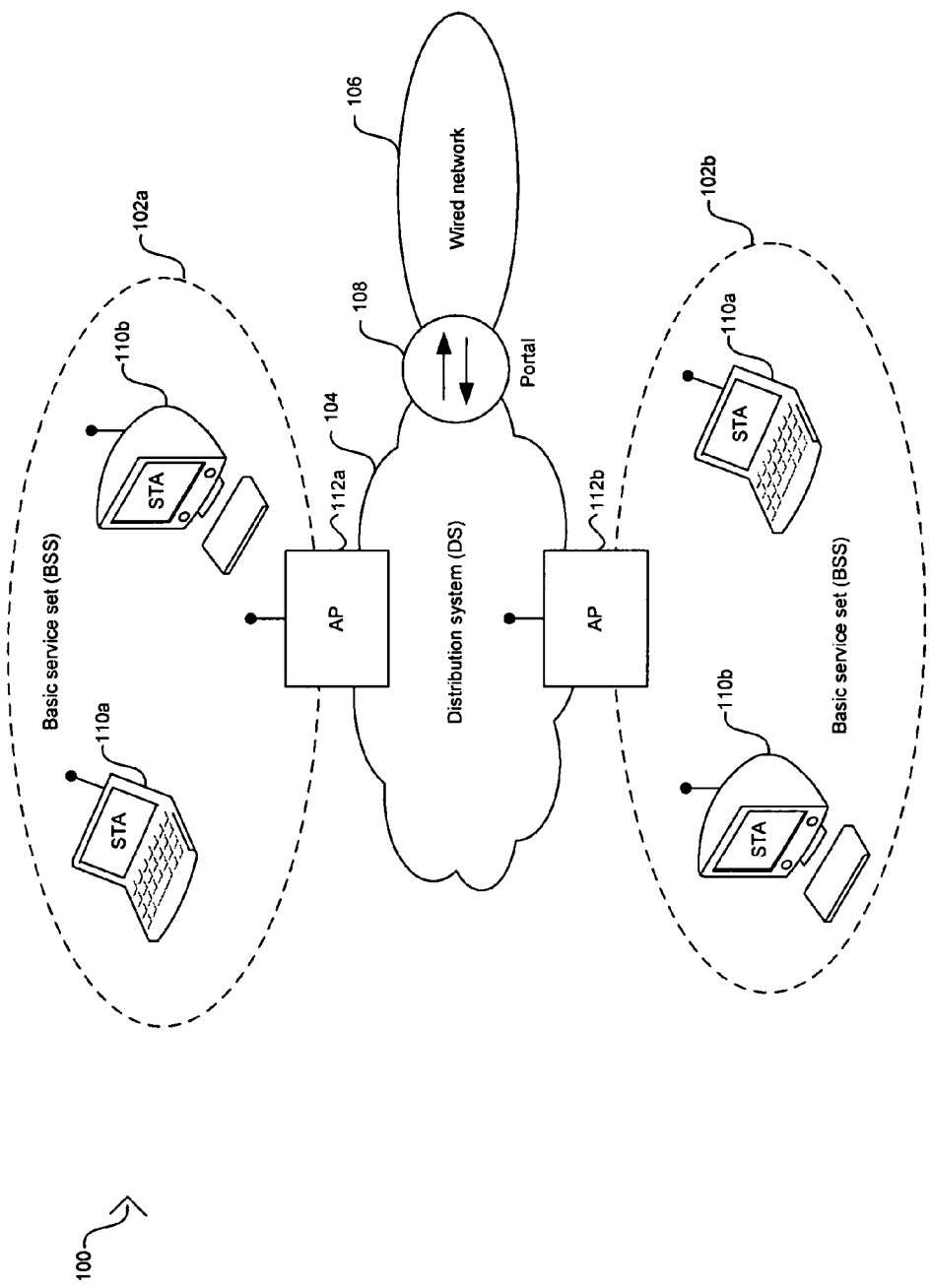
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
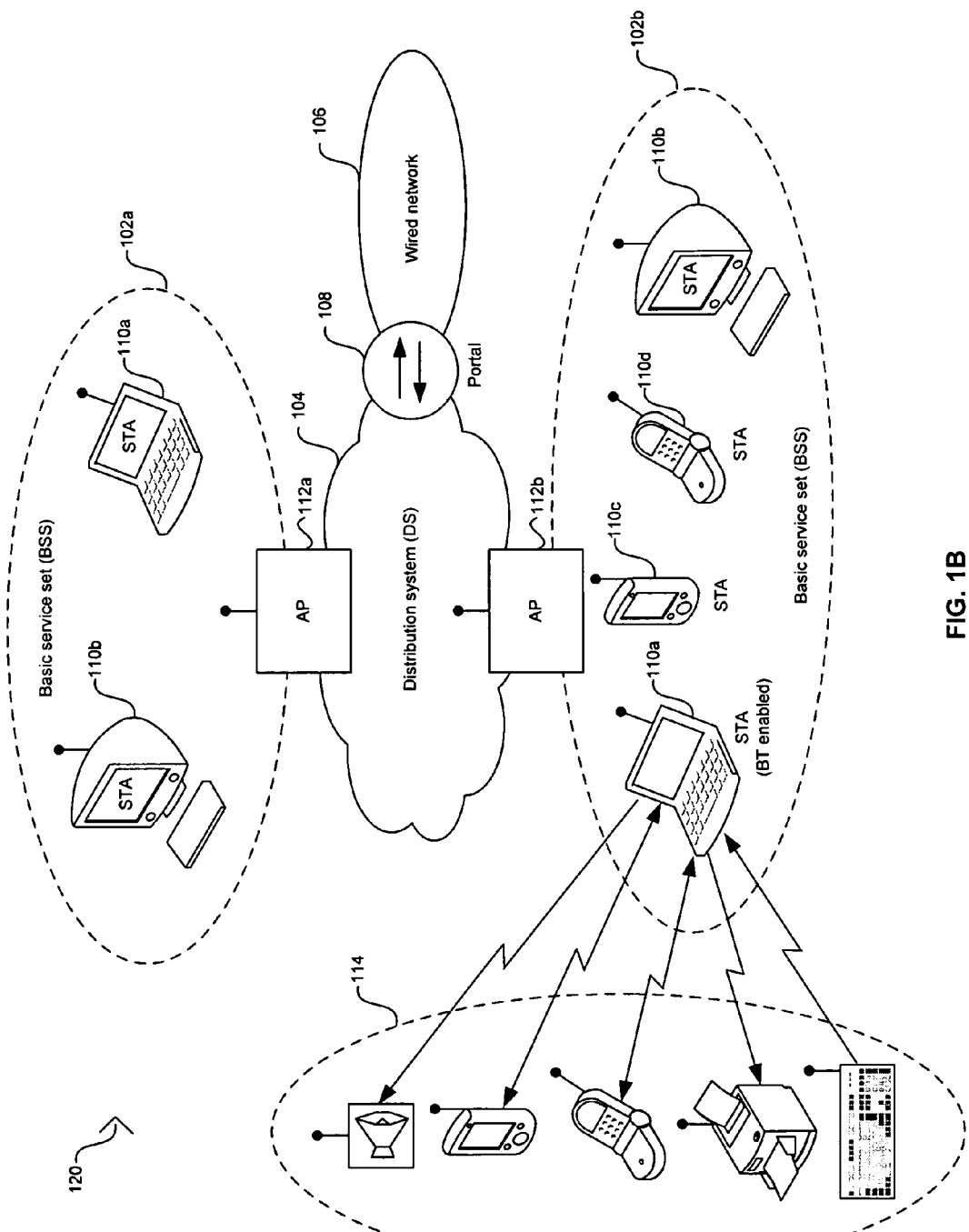
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising a basic service set (BSS) with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110a, locating the WLAN and BT radio devices in the same terminal may result in signal interference between WLAN and BT communications. When the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
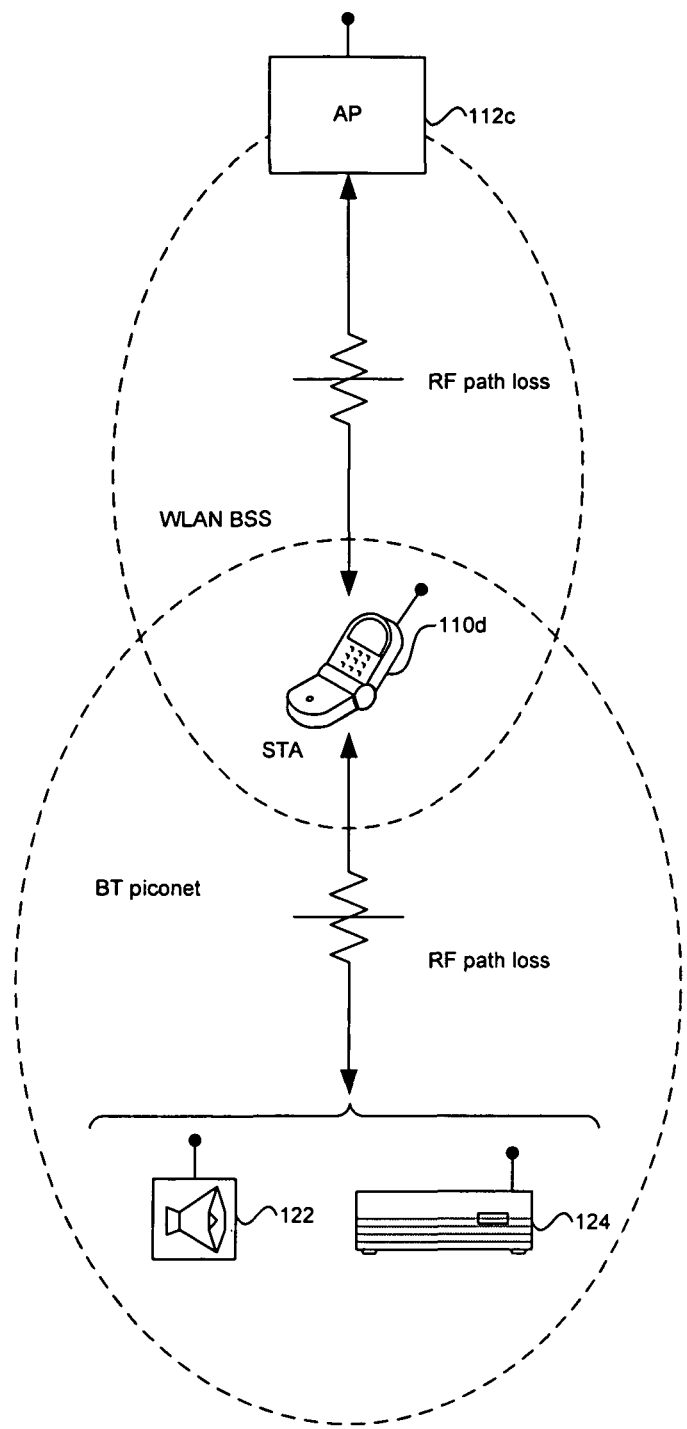
FIG. 1C is a block diagram that illustrates an exemplary usage model for a coexistence terminal with collocated WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the mobile phone 110d may comprise a WLAN radio device to communicate with the AP 112c. The RF path loss between the AP 112c and the mobile phone 110d may be, for example, 65 dB for 10 meters. The IEEE 802.15.2, for example, provides a formula for calculating the RF path loss. The mobile phone 110d may also be Bluetooth-enabled and may comprise a Bluetooth radio device to communicate with, for example, a Bluetooth headset 122 and/or a home gateway 124 with Bluetooth cordless telephony capability. Because of the small form factor of the mobile phone 110d, the WLAN and Bluetooth radio devices may be in such close proximity to each other within the same coexistence terminal that the isolation between them is sufficiently low to allow desensitization of one radio device by the other's transmissions.

The Bluetooth-enabled mobile phone 110d may comprise two maximum transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth handset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112c and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110d which in turn may communicate the voice contents to other users through the WLAN infrastructure network.

A Bluetooth-enabled station, such as the Bluetooth-enabled mobile phone 110d in FIG. 1C, for example, may support the communication of multiple Bluetooth packets. For example, a Bluetooth-enabled station may support common packets types, synchronous connection-oriented (SCO) logical transport packets, extended SCO (eSCO) logical transport packets, and/or asynchronous connection-oriented (ACL) logical transport packets.

Figure 2:
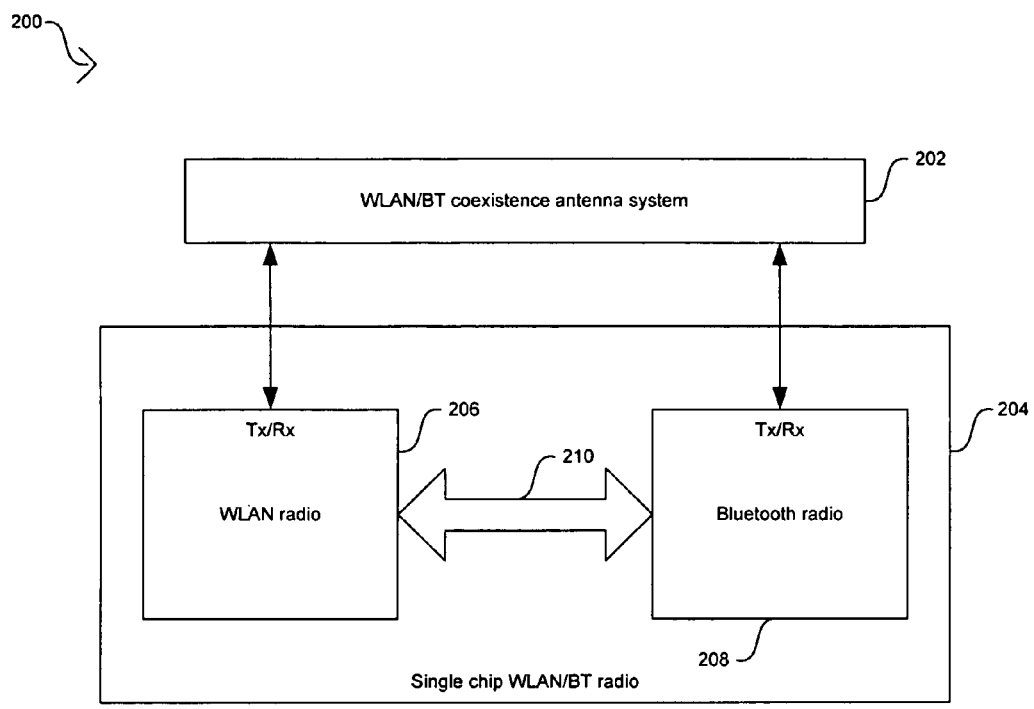
FIG. 2 is a block diagram that illustrates an exemplary single integrated circuitry (IC) that supports WLAN and Bluetooth radio operations, in accordance with an embodiment of the invention.

FIG. 2 is a block diagram that illustrates an exemplary single integrated circuitry (IC) that supports WLAN and Bluetooth radio operations, in accordance with an embodiment of the invention. Referring to FIG. 2, there is shown a WLAN/Bluetooth collaborative radio architecture 200 that may comprise a WLAN/Bluetooth coexistence antenna system 202 and a single chip WLAN/Bluetooth (WLAN/BT) radio device 204. The single chip WLAN/BT radio device 204 may comprise a WLAN radio portion 206 and a Bluetooth radio portion 208. The single chip WLAN/BT radio device 204 may be implemented based on a system-on-chip (SOC) architecture, for example.

The WLAN/Bluetooth coexistence antenna system 202 may comprise suitable hardware, logic, and/or circuitry that may be adapted to provide WLAN and Bluetooth communication between external devices and a coexistence terminal. The WLAN/Bluetooth coexistence antenna system 202 may comprise at least one antenna for the transmission and reception of WLAN and Bluetooth packet traffic. In this regard, the antenna or antennas utilized in the WLAN/Bluetooth coexistence antenna system 202 may be designed to meet the form factor requirements of the coexistence terminal.

The WLAN radio portion 206 may comprise suitable logic, circuitry, and/or code that may be adapted to process WLAN protocol packets for communication. The WLAN radio portion 206 may be adapted to transfer and/or receive WLAN protocol packets and/or information to the WLAN/Bluetooth coexistence antenna system 202 via a single transmit/receive (Tx/Rx) port. In some instances, the transmit port (Tx) may be implemented separately from the receive port (Rx). The WLAN radio portion 206 may also be adapted to generate signals that control at least a portion of the operation of the WLAN/Bluetooth coexistence antenna system 202. Firmware operating in the WLAN radio portion 206 may be utilized to schedule and/or control WLAN packet communication.

The WLAN radio portion 206 may also be adapted to receive and/or transmit priority signals 210. The priority signals 210 may be utilized to schedule and/or control the collaborative operation of the WLAN radio portion 206 and the Bluetooth radio portion 208. In this regard, the priority signals 210 may comprise a plurality of signals to implement various levels of transmission priority. For example, a single signal implementation may result in two transmission priority levels, a two-signal implementation may result in up to four different transmission priority levels, and a three-signal implementation may result in up to eight different transmission priority levels.

The Bluetooth radio portion 208 may comprise suitable logic, circuitry, and/or code that may be adapted to process Bluetooth protocol packets for communication. The Bluetooth radio portion 208 may be adapted to transfer and/or receive Bluetooth protocol packets and/or information to the WLAN/Bluetooth coexistence antenna system 202 via a single transmit/receive (Tx/Rx) port. In some instances, the transmit port (Tx) may be implemented separately from the receive port (Rx). The Bluetooth radio portion 208 may also be adapted to generate signals that control at least a portion of the operation of the WLAN/Bluetooth coexistence antenna system 202. Firmware operating in the Bluetooth radio portion 208 may be utilized to schedule and/or control Bluetooth packet communication. The Bluetooth radio portion 208 may also be adapted to receive and/or transmit priority signals 210. A portion of the operations supported by the WLAN radio portion 206 and a portion of the operations supported by the Bluetooth radio portion 208 may be performed by common logic, circuitry, and/or code.

In some instances, at least a portion of either the WLAN radio portion 206 or the Bluetooth radio portion 208 may be disabled and the wireless terminal may operate in a single-communication mode, that is, coexistence may be disabled. When at least a portion of the WLAN radio portion 206 is disabled, the WLAN/Bluetooth coexistence antenna system 202 may utilize a default configuration to support Bluetooth communication. When at least a portion of the Bluetooth radio portion 208 is disabled, the WLAN/Bluetooth coexistence antenna system 202 may utilize a default configuration to support WLAN communication.

Packet communication between the WLAN/Bluetooth coexistence antenna system 202 and the single chip WLAN/Bluetooth (WLAN/BT) radio device 204 may take place via a radio front-end topology in the single chip WLAN/Bluetooth (WLAN/BT) radio device 204. The radio front-end topology may be implemented partially in the WLAN radio portion 206 and/or partially in the Bluetooth radio portion 208, for example.

Figure 3A:
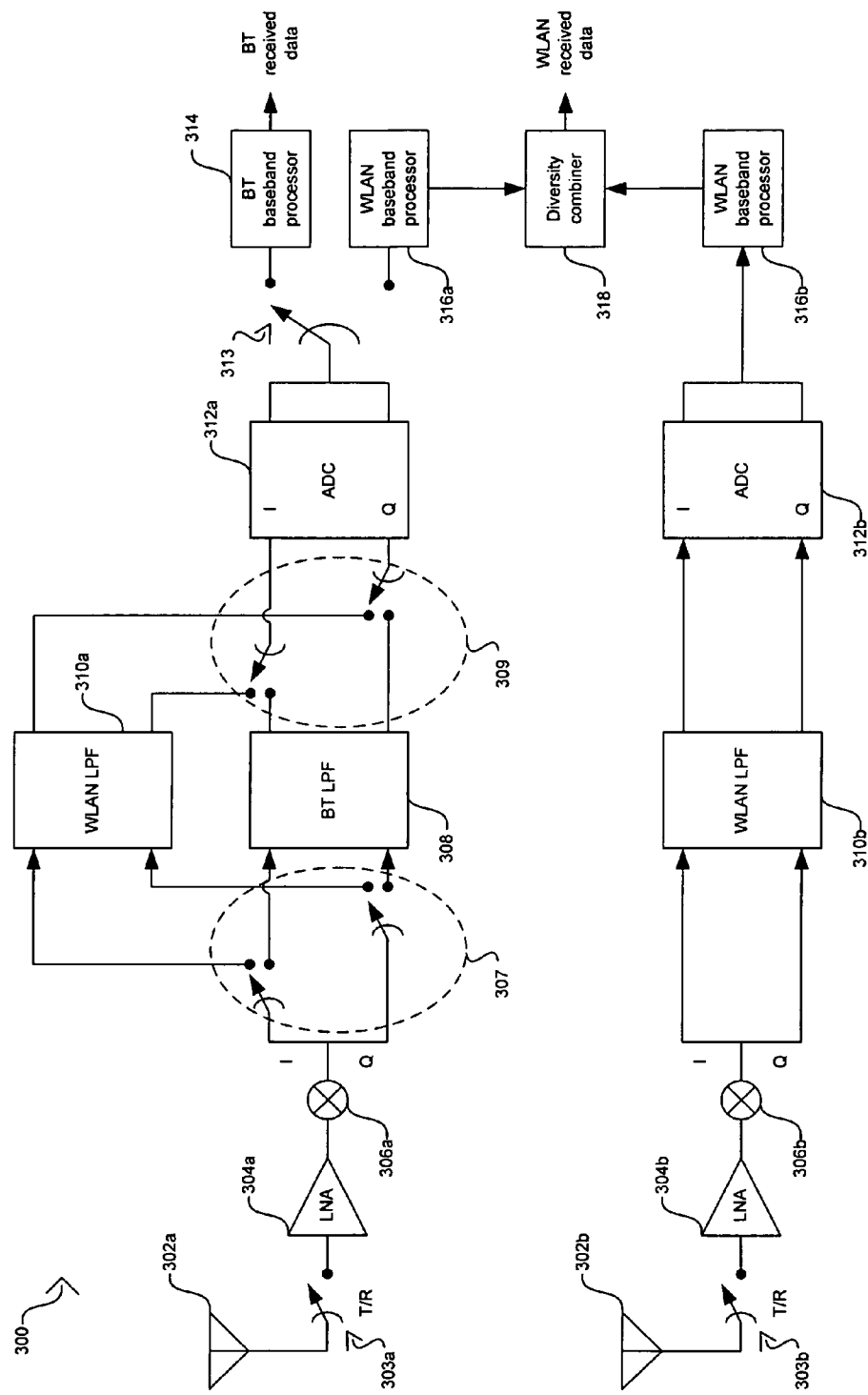
FIG. 3A is a block diagram that illustrates exemplary front-end topologies for WLAN and Bluetooth radio receivers in a single IC that supports WLAN and Bluetooth radio operations, in accordance with an embodiment of the invention.

FIG. 3A is a block diagram that illustrates exemplary front-end topologies for WLAN and Bluetooth radio receivers in a single IC that supports WLAN and Bluetooth radio operations, in accordance with an embodiment of the invention. Referring to FIG. 3A, there is shown a WLAN/BT front-end receiver 300 that may comprise antenna switches 303a and 303b, low noise amplifiers (LNAs) 304a and 304b, radio frequency (RF) mixers 306a and 306b, and a BT LPF 308, WLAN low pass filters (LPFs) 310a and 310b. The WLAN/BT front-end receiver 300 may also comprise a first filter switch 307, a BT LPF 308, a second filter switch 309, analog-to-digital converters (ADCs) 312a and 312b, a processor switch 313, a BT baseband processor 314, WLAN baseband processors 316a and 316b, and a diversity combiner 318. The WLAN/BT front-end receiver 300 may correspond to the RF front-end receiver of the single chip WLAN/BT radio device 204 in FIG. 2.

Also shown in FIG. 3A are antennas 302a and 302b. The antennas 302a and 302b may be implemented, for example, as part of the WLAN/BT coexistence antenna system 202 described in FIG. 2A. The antennas 302a and 302b may comprise suitable logic, circuitry, and/or code that may be adapted to receive and/or transmit RF signals. The antenna switches 303a and 303b may comprise suitable logic, circuitry, and/or code that may be adapted to communicatively couple the LNAs 304a and 304b to the antennas 302a and 302b respectively. In this regard, the antennas 302a and 302b may be utilized to receive RF signals that may be transferred to the LNAs 304a and 304b.

The LNAs 304a and 304b may comprise suitable logic, circuitry, and/or code that may be adapted to amplify the RF signals received from the antennas 302a and 302b. The RF mixers 306a and 306b may comprise suitable logic, circuitry, and/or code that may be adapted to receive the amplified RF signals from the LNAs 304a and 304b and generate in-phase (I) and quadrature (Q) signals.

The first filter switch 307 may comprise suitable logic, circuitry, and/or code that may be adapted to select between transferring the I and Q signals generated by the RF mixer 306a to the WLAN LPF 310a or the BT LPF 308. When the I and Q signals correspond to data and/or information supported by the Bluetooth standard, the first filter switch 307 may select to transfer the I and Q signals to the BT LPF 308. When the I and Q signals correspond to data and/or information supported by the WLAN standard, the first filter switch 307 may select to transfer the I and Q signals to the WLAN-LPF 310a.

The WLAN LPFs 310a and 310b may comprise suitable logic, circuitry, and/or code that may be adapted to low pass filter the I and Q signals generated by the RF mixers 306a and 306b respectively. The WLAN LPFs 310a and 310b may be adapted to have a bandwidth of approximately 20 MHz, for example. The BT LPF 308 may comprise suitable logic, circuitry, and/or code that may be adapted to low pass filter the I and Q signals generated by the RF mixer 306a. The BT LPF 308 may be adapted to have a bandwidth of approximately 1 MHz, for example.

The second filter switch 309 may comprise suitable logic, circuitry, and/or code that may be adapted to select between transferring the I and Q signals filtered by the WLAN LPF 310a or the BT LPF 308 to the ADC 312a. When the I and Q signals correspond to data and/or information supported by the Bluetooth standard, the second filter switch 309 may select to transfer the I and Q signals filtered by the BT LPF 308 to the ADC 312a. When the I and Q signals correspond to data and/or information supported by the WLAN standard, the second filter switch 309 may select to transfer the I and Q signals filtered by the WLAN LPF 310a to the ADC 312a.

The ADCs 312a and 312b may comprise suitable logic, circuitry, and/or code that may be adapted to convert the filtered I and Q signals to digital format. The ADCs 312a and 312b may be adapted to generate N-bit digital words from the filtered I and Q signals, where N denotes the resolution of the digital conversion. The value of N may depend on the inputs of the BT baseband processor 314 and the WLAN baseband processors 316a and 316b. The processor switch 313 may comprise suitable logic, circuitry, and/or code that may be adapted to select between transferring the digital output of the ADC 312a to the BT baseband processor 314 or the WLAN baseband processor 316a. When the I and Q signals have been filtered by the BT LPF 308, the processor switch 313 may be configured so as to enable transfer of the digitized filtered I and Q signals to the BT baseband processor 314. When the I and Q signals have been filtered by the WLAN LPF 310a, the processor switch 313 may be configured so as to enable transfer of the digitized filtered I and Q signals to the WLAN baseband processor 316a.

The BT baseband processor 314 may comprise suitable logic, circuitry, and/or code that may be adapted to digitally process data and/or information received from the ADC 312a that may be based on the Bluetooth standard. In this regard, the BT baseband processor 314 may be adapted to generate a BT received data output. The WLAN baseband processors 316a and 316b may comprise suitable logic, circuitry, and/or code that may be adapted to digitally process data and/or information received from the ADCs 312a and 312b respectively that may be based on the WLAN standard. The WLAN baseband processors 316a and 316b may be adapted to generate attenuation factors and/or phase shifts of the communication channels associated with the RF signals received by the antennas 302a and 302b respectively. In this regard, the WLAN baseband processors 316a and 316b may be adapted to transfer the generated attenuation factors and/or phase shifts to the diversity combiner 318. Moreover, the WLAN baseband processors 326a and 316b may be adapted to transfer processed data and/or information that may be based on the WLAN standard to the diversity combiner 318.

The diversity combiner 318 may comprise suitable logic, circuitry, and/or code that may be adapted to perform antenna diversity combining operations on data and/or information received that is based on the WLAN standard. The diversity combiner 318 may be adapted to combine at least a portion of the outputs of the WLAN baseband processors 316a and 316b to generate a WLAN received data output. The diversity combiner 318 may be adapted to provide selection gain diversity or maximal ratio combining (MRC) operations, for example.

The architecture provided by the WLAN/BT front-end receiver 300 allows the use of the antenna 302a, which may generally be utilized for Bluetooth communications, to also be utilized as a second WLAN antenna in order to enable antenna diversity operations for fading WLAN multipath channels, for example. While the WLAN/BT front-end receiver 300 may be implemented to provide a two-antenna diversity operation for WLAN communications, it need not be so limited. Accordingly, the WLAN/BT front-end receiver 300 may be implemented to support an M-antenna diversity operation for WLAN communications, where M≥2.

Figure 3B:
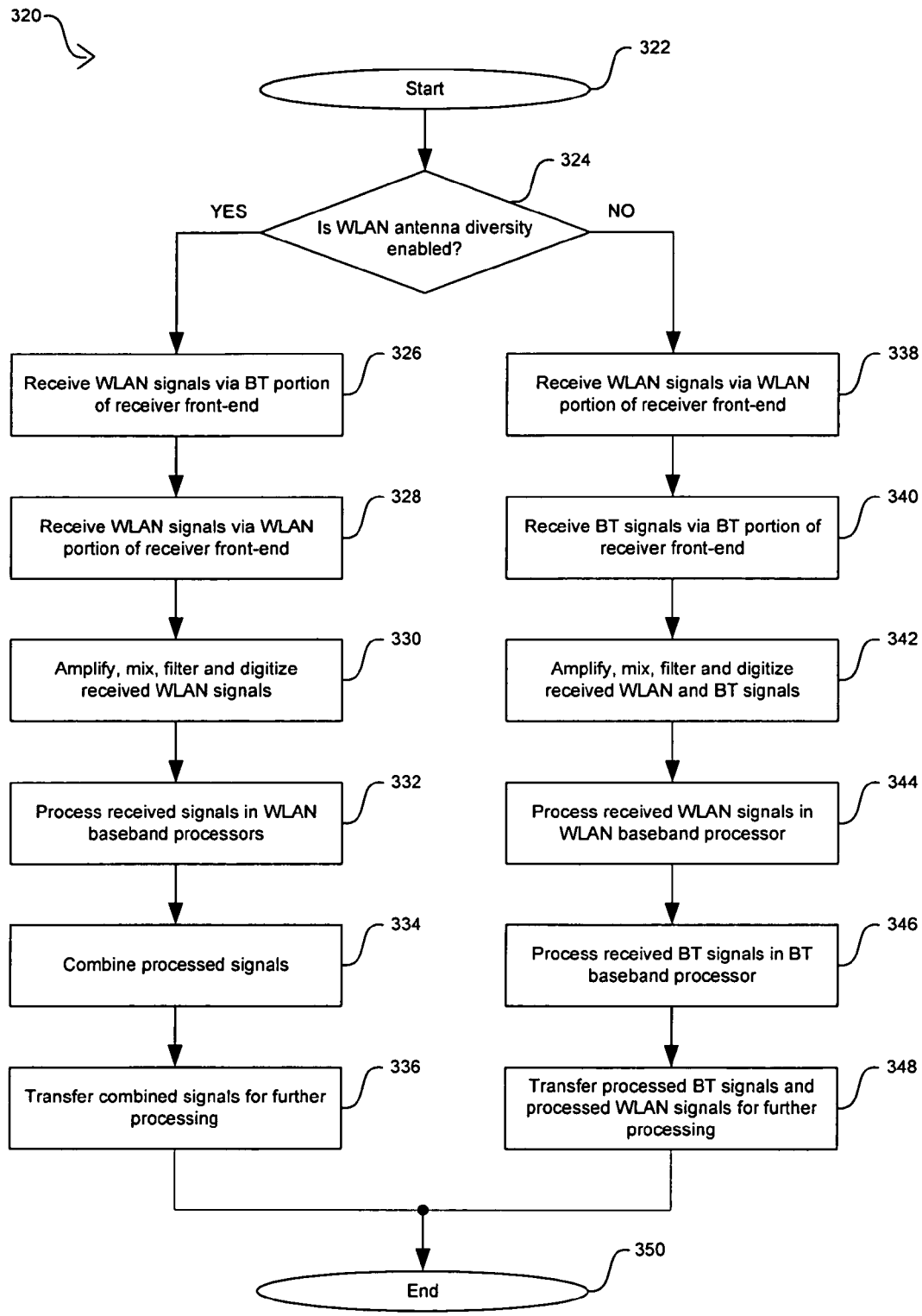
FIG. 3B is a flow diagram that illustrates exemplary steps for operating the front-end WLAN and Bluetooth radio receivers in a single IC that supports WLAN and Bluetooth radio operations, in accordance with an embodiment of the invention.

FIG. 3B is a flow diagram that illustrates exemplary steps for operating the front-end WLAN and Bluetooth radio receivers in a single IC that supports WLAN and Bluetooth radio operations, in accordance with an embodiment of the invention. Referring to FIG. 3B, there is shown a flow diagram 320. After start step 322, in step 324, the single chip WLAN/BT radio device 204 may determine whether WLAN antenna diversity operations in the WLAN/BT front-end receiver 300 may be enabled. When the single chip WLAN/BT radio device 204 determines that WLAN antenna diversity operations are to be utilized, the process may proceed to step 326.

In step 326, WLAN signals may be received via the antenna 302a. The WLAN signals received via the antenna 302a may be said to have been received via the Bluetooth portion of the WLAN/BT front-end receiver 300. In step 328, WLAN signals may be received via the antenna 302b. The WLAN signals received via the antenna 302b may be said to have been received via the WLAN portion of the WLAN/BT front-end receiver 300.

In step 330, the WLAN signals received via the antenna 302a may be amplified by the LNA 304a, mixed by the RF mixer 306a, filtered by the WLAN LPF 310a, and digitized by the ADC 312a. In this regard, the first filter switch 307 and the second filter switch 309 may be positioned to select filtering by the WLAN LPF 310a. Moreover, the WLAN signals received via the antenna 302b may be amplified by the LNA 304b, mixed by the RF mixer 306b, filtered by the WLAN LPF 310b, and digitized by the ADC 312b.

In step 332, the outputs of the ADC 312a and the ADC 312b may be transferred to the WLAN baseband processors 316a and 316b for processing. In step 334, the outputs of the WLAN baseband processors 316a and 316b may be transferred to the diversity combiner 318 to perform antenna diversity combining operations. In step 336, the output of the diversity combiner 318, the WLAN received data, may be transferred to other portions of the single chip WLAN/BT radio device 204 for further processing, for example. After step 336, the process may proceed to end step 350.

Returning to step 324, when the single chip WLAN/BT radio device 204 determines that WLAN antenna diversity operations are not to be utilized, the process may proceed to step 338. In step 338, WLAN signals may be received via the antenna 302b. The WLAN signals received via the antenna 302b may be said to have been received via the WLAN portion of the WLAN/BT front-end receiver 300. In step 340, Bluetooth signals may be received via the antenna 302a. The Bluetooth signals received via the antenna 302a may be said to have been received via the Bluetooth portion of the WLAN/BT front-end receiver 300.

In step 342, the Bluetooth signals received via the antenna 302a may be amplified by the LNA 304a, mixed by the RF mixer 306a, filtered by the BT LPF 308, and digitized by the ADC 312a. In this regard, the first filter switch 307 and the second filter switch 309 may be positioned to select filtering by the BT LPF 308. Moreover, the WLAN signals received via the antenna 302b may be amplified by the LNA 304b, mixed by the RF mixer 306b, filtered by the WLAN LPF 310b, and digitized by the ADC 312b.

In step 344, the output of the ADC 312b may be transferred to the WLAN baseband processor 316b for processing. In step 346, output of the ADC 312a may be transferred to the BT baseband processor 314 for processing. In step 348, the output of the WLAN baseband processor 316b may be transferred to the diversity combiner 318 where no antenna diversity combining operation may occur. The output of the diversity combiner 318 may be transferred to other portions of the single chip WLAN/BT radio device 204 for further processing, for example. In another embodiment of the inventions, the output of the WLAN baseband processor 316b may be directly transferred to other portions of the single chip WLAN/BT radio device 204 for further processing. Moreover, the output of the BT baseband processor 314 may also be directly transferred to other portions of the single chip WLAN/BT radio device 204 for further processing, for example. After step 348, the process may proceed to end step 350.

Figure 4A:
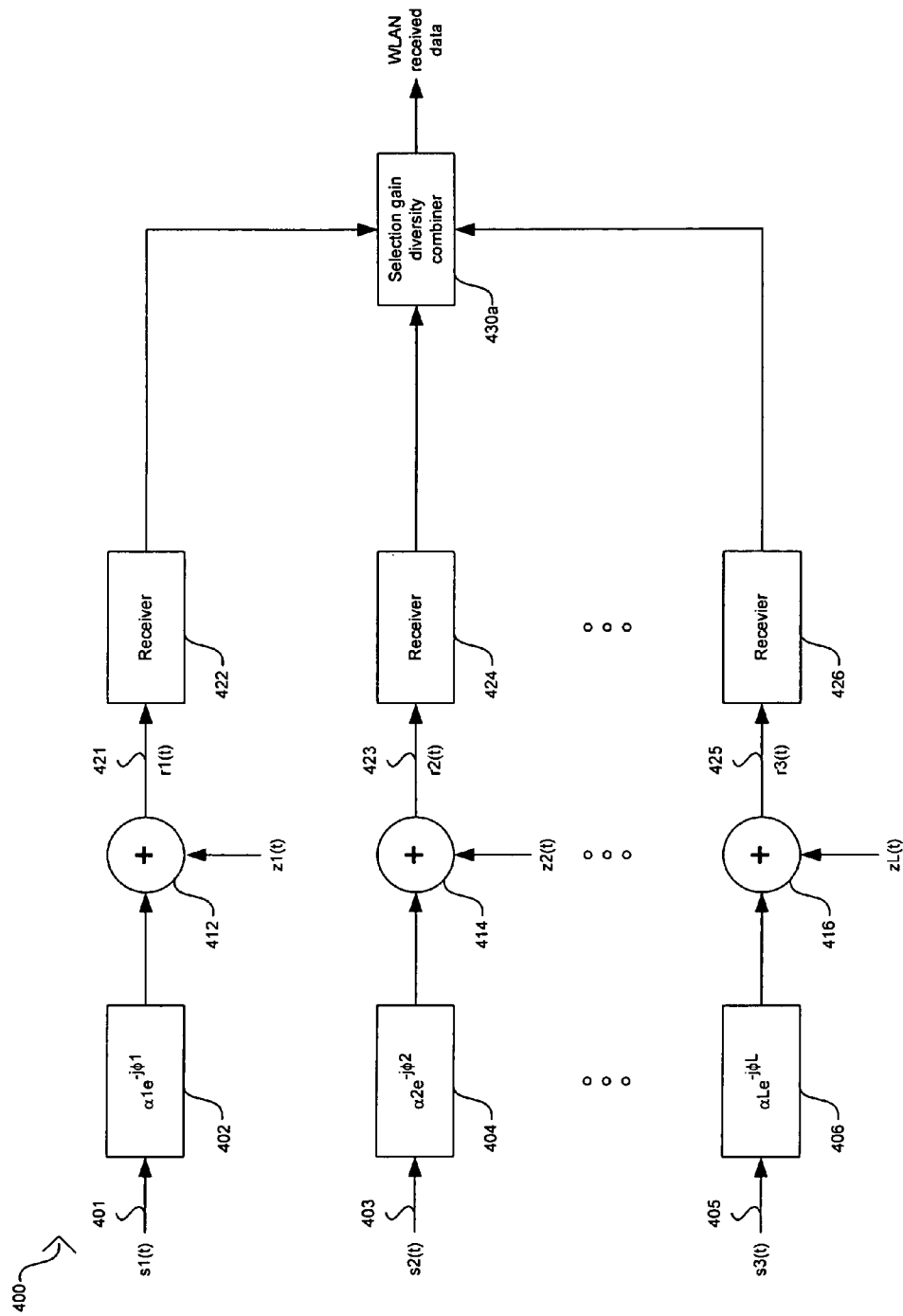
FIG. 4A is a block diagram illustrating an exemplary communication channel with a diversity combiner based on a selection diversity gain combiner, in accordance with an embodiment of the invention.

FIG. 4A is a block diagram illustrating an exemplary communication channel with a diversity combiner based on a selection diversity gain combiner, in accordance with an embodiment of the invention. Referring to 4A, there is shown a communication channel 400 that comprises L diversity channels carrying information-bearing signals. The communication channel 400 may comprise a first signal 401, a second signal 403, and an $L^{th}$ signal 405. The first signal 401 may be labeled s1(t), the second signal 403 may be labeled s2(t), and the $L^{th}$ signal 405 may be labeled sL(t). During transmission, each signal may be affected by channel fading and/or noise. The signal s1(t) may be modified and may result in received signal 421. Received signal 412 may be labeled r1(t) and may be generated after the corresponding channel attenuation/phase factor 402 and additive noise element 412 for the first channel are considered. In this regard, $r1(t)=\alpha_1 \exp(-j\phi_1)*s1(t)+z1(t)$, where $\alpha_1$ is the attenuation factor in the first channel, $\phi_1$ is the phase shift in the first channel, and z1(t) corresponds to the additive noise element 412.

Similarly, the signal s2(t) may be modified and may result in received signal 423. Received signal 413 may be labeled r2(t) and may be generated after the corresponding channel attenuation/phase factor 404 and additive noise element 414 for the second channel are considered. In this regard, $r2(t)=\alpha_2\exp(-j\phi_2)*s2(t)+z2(t)$, where $\alpha_2$ is the attenuation factor in the second channel, $\phi_2$ is the phase shift in the second channel, and z2(t) corresponds to the additive noise element 414. The signal sL(t) may be modified and may result in received signal 425. Received signal 425 may be labeled rL(t) and may be generated after the corresponding channel attenuation/phase factor 406 and additive noise element 416 for the $L^{th}$ channel are considered. In this regard, $rL(t)=\alpha_L\exp(-j\phi_L)*sL(t)+zl(t)$, where $\alpha_l$ is the attenuation factor in the $L^{th}$ channel, $\phi_L$ is the phase shift in the $L^{th}$ channel, and zL(t) corresponds to the additive noise element 416.

The communication channel 400 may comprise receivers 422, 424, ..., and 426. The receivers 422, 424, ..., and 426 may comprise suitable logic, circuitry, and/or code that may be adapted to demodulate the received signals. The received signals r1(t), r2(t), ..., and rL(t) may be demodulated by the receivers 422, 424, ..., and 426 respectively. The receivers 422, 424, ..., and 426 may be implemented, for example, by utilizing at least one matched filter. The outputs of the receivers 422, 424, ..., and 426 may be transferred to a selection gain diversity combiner 430a. The selection gain diversity combiner 430a may comprise suitable logic, circuitry, and/or code that may be adapted to combine the outputs of the receivers 422, 424, . . . , and 426 by assigning different weights to each of the signals to generate a single weighted received data signal. When utilized for WLAN-only reception, the selection gain diversity combiner 430a may generate a WLAN received data signal. In some instances, when a signal received by the selection gain diversity combiner 430a is below a threshold level, the signal may be dropped or not utilized in generating the single weighted received data signal.

The received signals r1(t), r2(t), . . . , and rL(t) may correspond to signals received by different receive paths in a radio receiver. The implementation of the WLAN/BT front-end receiver 300 in FIG. 3A may be adapted to utilize two receive paths for WLAN reception. In this regard, the received signal r1(t) may correspond to a first WLAN signal received via the Bluetooth front-end portion of the WLAN/BT front-end receiver 300 and the received signal r2(t) may correspond to a second WLAN signal received via the WLAN front-end portion of the WLAN/BT front-end receiver 300, for example. The receiver 422 that corresponds to the first WLAN signal may be implemented in the WLAN baseband processor 316a, for example. The receiver 424 that corresponds to the second WLAN signal may be implemented in the WLAN baseband processor 316b, for example. Moreover, the selection gain diversity combiner 430a may correspond to an implementation of the diversity combiner 318 in FIG. 3A.

For the exemplary embodiment described in FIG. 3A, there are two (2) diversity channels carrying information-bearing signals as a result of the availability of two distinct antennas. In this regard, the communication channel 400 in FIG. 4A may generate the single weighted received data signal based on an implementation that utilizes two received signals.

Figure 4B:
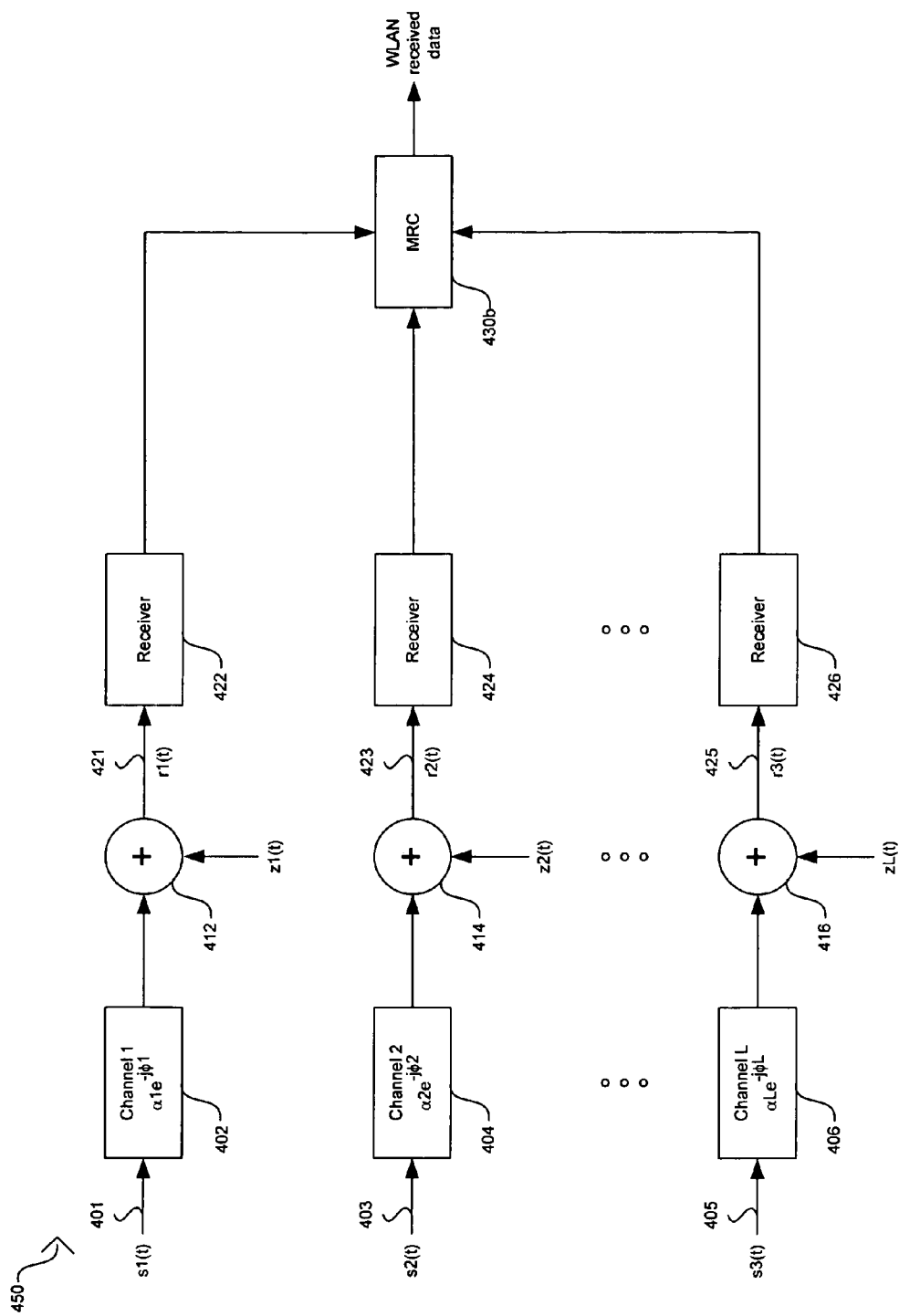
FIG. 4B is a block diagram illustrating an exemplary communication channel with a diversity combiner based on a maximal ratio combiner (MRC), in accordance with an embodiment of the invention.

FIG. 4B is a block diagram illustrating an exemplary communication channel with diversity combiner based on a maximal ratio combiner (MRC), in accordance with an embodiment of the invention. Referring to FIG. 4B, there is shown a communication channel 450 that differs from the communication channel 400 in FIG. 4A in that a maximal ratio combiner (MRC) 430b may be utilized to combine the outputs of the receivers 422, 424, . . . , and 426. The MRC 430b may comprise suitable logic, circuitry, and/or code that may be adapted to combine the matched filtered outputs of each receiver after multiplication by the corresponding complex conjugate channel gain $\alpha_k \exp(j\phi_k)$, where k denotes the channel. When utilized for WLAN-only reception, the MRC 430b may generate a WLAN received data signal. The MRC 430b may correspond to an implementation of the diversity combiner 318 in FIG. 3A. In some instances, when a signal received by the MRC 430b is below a threshold level, the signal may be dropped or not utilized in generating the WLAN received data signal.

For the exemplary embodiment described in FIG. 3A, there are two (2) diversity channels carrying information-bearing signals as a result of the availability of two distinct antennas. In this regard, the communication channel 450 in FIG. 4B may generate the single weighted received data signal based on an implementation that utilizes two received signals.

Figure 4C:
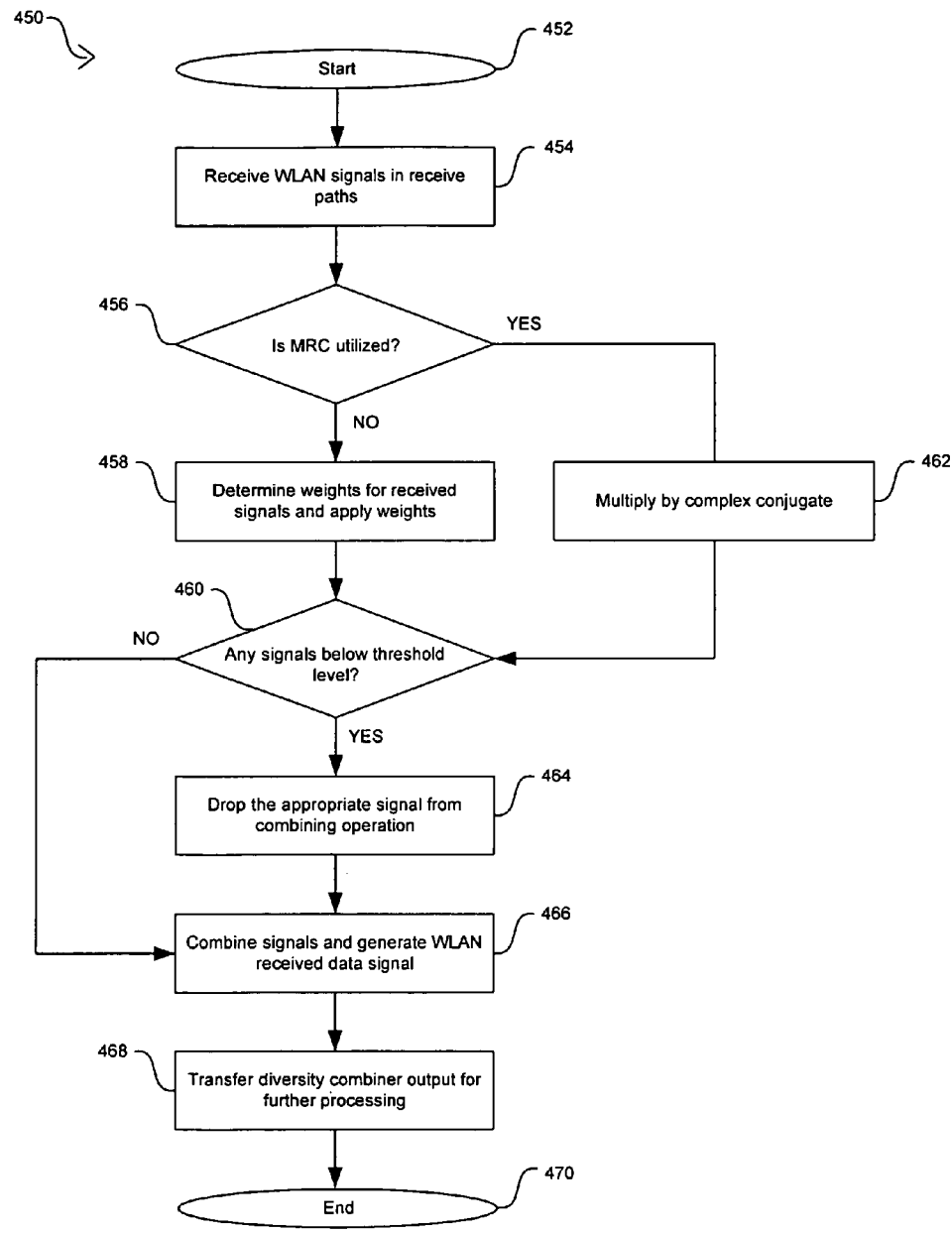
FIG. 4C is a flow diagram illustrating exemplary steps for diversity combining, in accordance with an embodiment of the invention.

FIG. 4C is a flow diagram illustrating exemplary steps for diversity combining, in accordance with an embodiment of the invention. Referring to FIG. 4C, there is shown a flow diagram 450. After start step 452, in step 454, a first WLAN signal may be received in the Bluetooth front-end portion of the WLAN/BT front-end receiver 300 in FIG. 3A. A second WLAN signal may be received in the WLAN front-end portion of the WLAN/BT front-end receiver 300. In step 456, when the diversity combiner 318 implements an MRC operation, the process may proceed to step 462. In step 462, the diversity combiner 318 may receive attenuation factors and/or phase shifts from the WLAN baseband processors 316a and 316b to generate the corresponding complex conjugates to the receiver outputs of the first WLAN and second WLAN signals. After step 462, the process may proceed to step 460. Returning to step 456, when the diversity combiner 318 implements a selection gain diversity combining operation, the process may proceed to step 458. In step 458, the signal strength of the receiver outputs may be determined and corresponding weights may be assigned. After step 462, the process may proceed to step 460.

In step 460, when a signal is below a threshold level, the process may proceed to step 464. In step 464, a signal that is below the threshold level may be dropped from the combining operation. After step 464, the process may proceed to step 464. Returning to step 460, when all signals are above a threshold level, the process may proceed to step 466. In step 466, the diversity combiner 318 may perform the combining operation and the WLAN received data signal may be generated. In step 468 the WLAN received data signal may be transferred to another portion of the single chip WLAN/Bluetooth (WLAN/BT) radio device 204 for further processing, for example. After step 468, the process may proceed to end step 470.

Figure 5A:
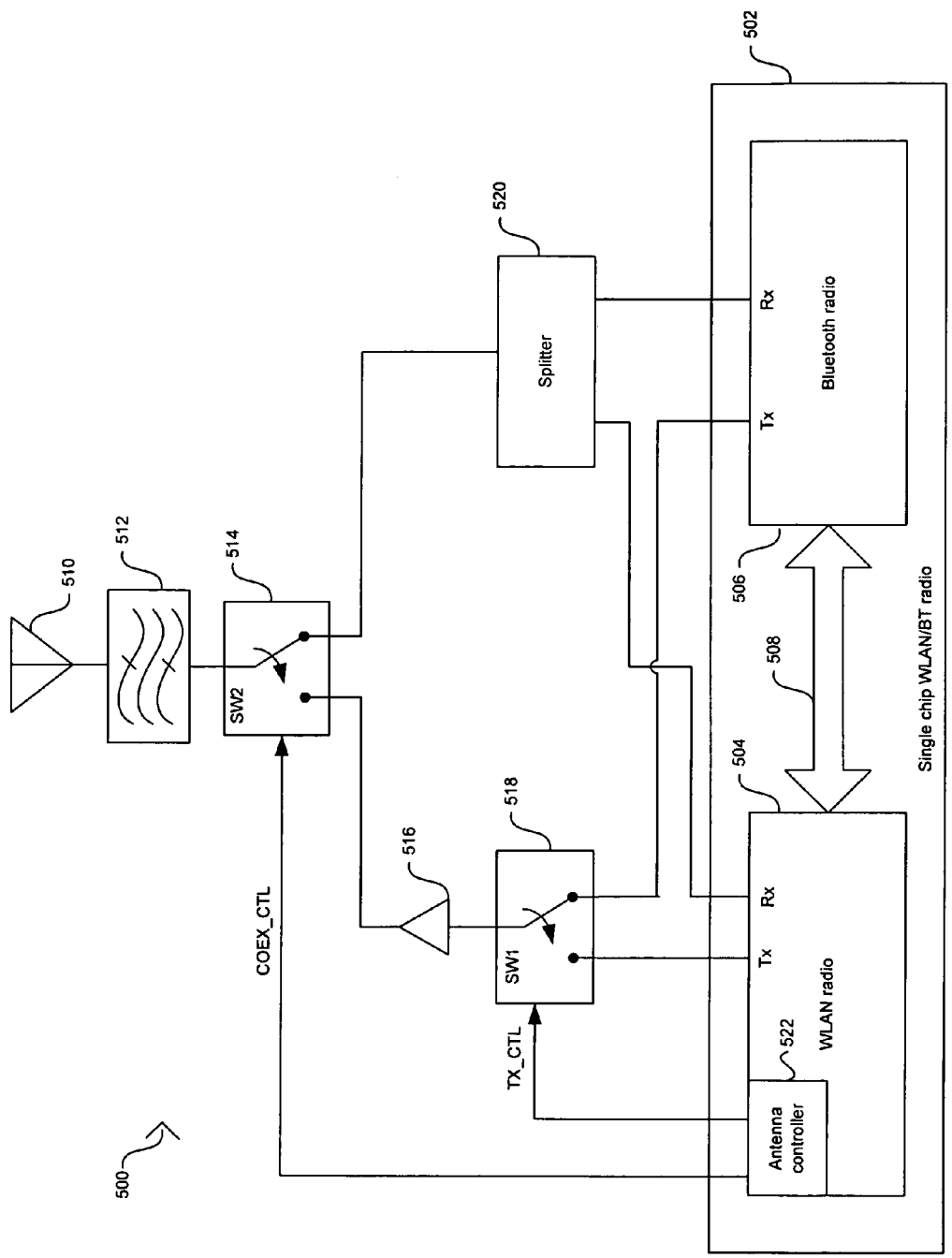
FIG. 5A is a block diagram illustrating an exemplary usage model for the single IC that supports WLAN and Bluetooth radio operations with one antenna, in accordance with an embodiment of the invention.

FIG. 5A is a block diagram illustrating an exemplary usage model for the single IC that supports WLAN and Bluetooth radio operations with one antenna, in accordance with an embodiment of the invention. Referring to FIG. 5A, the WLAN/Bluetooth collaborative radio architecture 500 may comprise a single antenna 510, a bandpass filter 512, a first antenna switch (SW1) 518, a second antenna switch (SW2) 514, a power amplifier (PA) 516, a splitter 520, and a single chip WLAN/Bluetooth (WLAN/BT) radio device 502. The single chip WLAN/BT radio device 502 may comprise a WLAN radio portion 504 and a Bluetooth radio portion 506. The WLAN radio portion 504 may comprise an antenna controller 522.

The single antenna 510 may comprise suitable logic, circuitry, and/or code that may be adapted to provide transmission and reception of Bluetooth and WLAN communication. In this regard, the single antenna 510 may be utilized for transmission and reception of a plurality of communication protocols. The bandpass filter 512 may comprise suitable hardware, logic, and/or circuitry that may be adapted to perform bandpass filtering on communication signals. The bandpass filter 512 may be implemented by utilizing a polyphase filter, for example. The bandpass filter 512 may be configured to conform to the bandpass requirements for the ISM band.

The SW1 518 and the SW2 514 may comprise suitable logic, circuitry, and/or code that may be adapted to select from signals at two input ports one that may be connected to an output port. The SW1 518 and SW2 514 may be implemented by utilizing, for example, single pull double throw (SPDT) switching devices. The selection operation of the SW1 518 may be controlled by a control signal such as a WLAN transmission control (TX_CTL) signal generated by the antenna controller 522. The selection operation of the SW2 514 may be controlled by a control signal such as the coexistence control (COEX_CTL) signal generated by the antenna controller 522.

The WLAN radio portion 504 in the single chip WLAN/BT radio device 502 may comprise suitable logic, circuitry, and/or code that may be adapted to process WLAN protocol packets for communication. The antenna controller 522 in the WLAN radio portion 504 may comprise suitable logic, circuitry, and/or code that may be adapted to generate at least the TX_CTL and/or COEX_CTL control signals for configuring the station to receive and/or transmit WLAN and/or Bluetooth data. As shown, the WLAN radio portion 504 may comprise separate ports for transmission (Tx) and reception (Rx) of WLAN packet traffic. However, a single TX/RX port may also be utilized for WLAN communication. The WLAN radio portion 504 may be adapted to generate and/or receive at least one priority signal 508 for controlling and/or scheduling collaborative communication with the Bluetooth radio portion 506.

The Bluetooth radio portion 506 may comprise suitable logic, circuitry, and/or code that may be adapted to process Bluetooth protocol packets for communication. As shown, the Bluetooth radio portion 506 may comprise separate ports for transmission (Tx) and reception (Rx) of Bluetooth packet traffic. However, a single TX/RX port may also be utilized for Bluetooth communication. The Bluetooth radio portion 506 may be adapted to generate and/or receive at least one priority signal 508 for controlling and/or scheduling collaborative communication with the WLAN radio portion 504.

In some instances, either WLAN communication or Bluetooth communication may be disabled and the station may not operate in a coexistence mode. When the WLAN communication is disabled, the SW1 518 and/or the SW2 514 may utilize a default configuration to support Bluetooth communication. When the Bluetooth communication is disabled, the SW1 518 and/or the SW2 514 may utilize a default configuration to support WLAN communication.

The splitter 520 may comprise suitable hardware, logic, and/or circuitry that may be adapted to split a received communication data into a BT received data and a WLAN received data. The splitter 520 may be utilized to support separate Bluetooth reception and transmission paths and to reduce the need to arbitrate or schedule simultaneous Bluetooth and WLAN receptions. In some instances, another switch may be utilized to bypass the splitter 520 and reduce the implementation loss when operating in a WLAN-only or Bluetooth-only mode. The PA 516 may comprise suitable logic, circuitry, and/or code that may be adapted to amplify Bluetooth and/or WLAN transmission signals. The PA 516 may provide, for example, a 20 dB gain and may be implemented on-chip or off-chip. In this regard, the PA 516 may be utilized to provide class 1 operations for Bluetooth transmissions while also supporting WLAN transmissions.

Figure 5B:
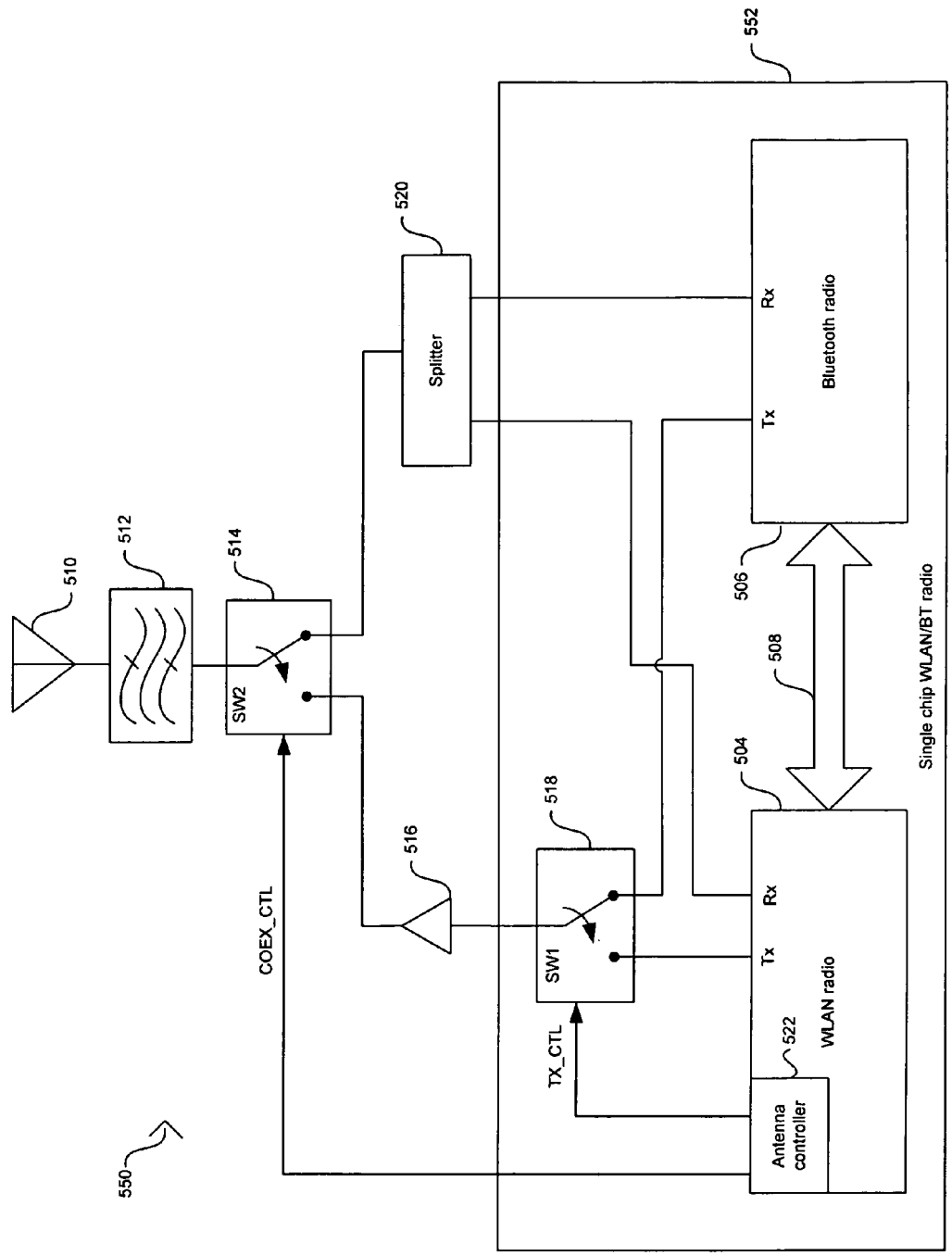
FIG. 5B is a block diagram illustrating an exemplary usage model for the single IC that supports WLAN and Bluetooth radio operations with one antenna utilizing an integrated antenna switch, in accordance with an embodiment of the invention.

FIG. 5B is a block diagram illustrating an exemplary usage model for the single IC that supports WLAN and Bluetooth radio operations with one antenna utilizing an integrated antenna switch, in accordance with an embodiment of the invention. Referring to FIG. 5B, there is shown a WLAN/Bluetooth collaborative radio architecture 550 in which the SW1 518 in FIG. 5A may be integrated into a single chip WLAN/BT radio device 552. In this regard, the single chip WLAN/BT radio device 552 may be substantially similar to the single chip WLAN/BT radio device 502 in FIG. 5A. The TX_CTL control signal may be utilized to control the operation of the integrated SW1 518 and may be internally communicated from the antennal controller 522 to the SW1 518. In some instances, the PA 516 in FIG. 5A may also be integrated into the single chip WLAN/BT radio device 552.

Figure 5C:
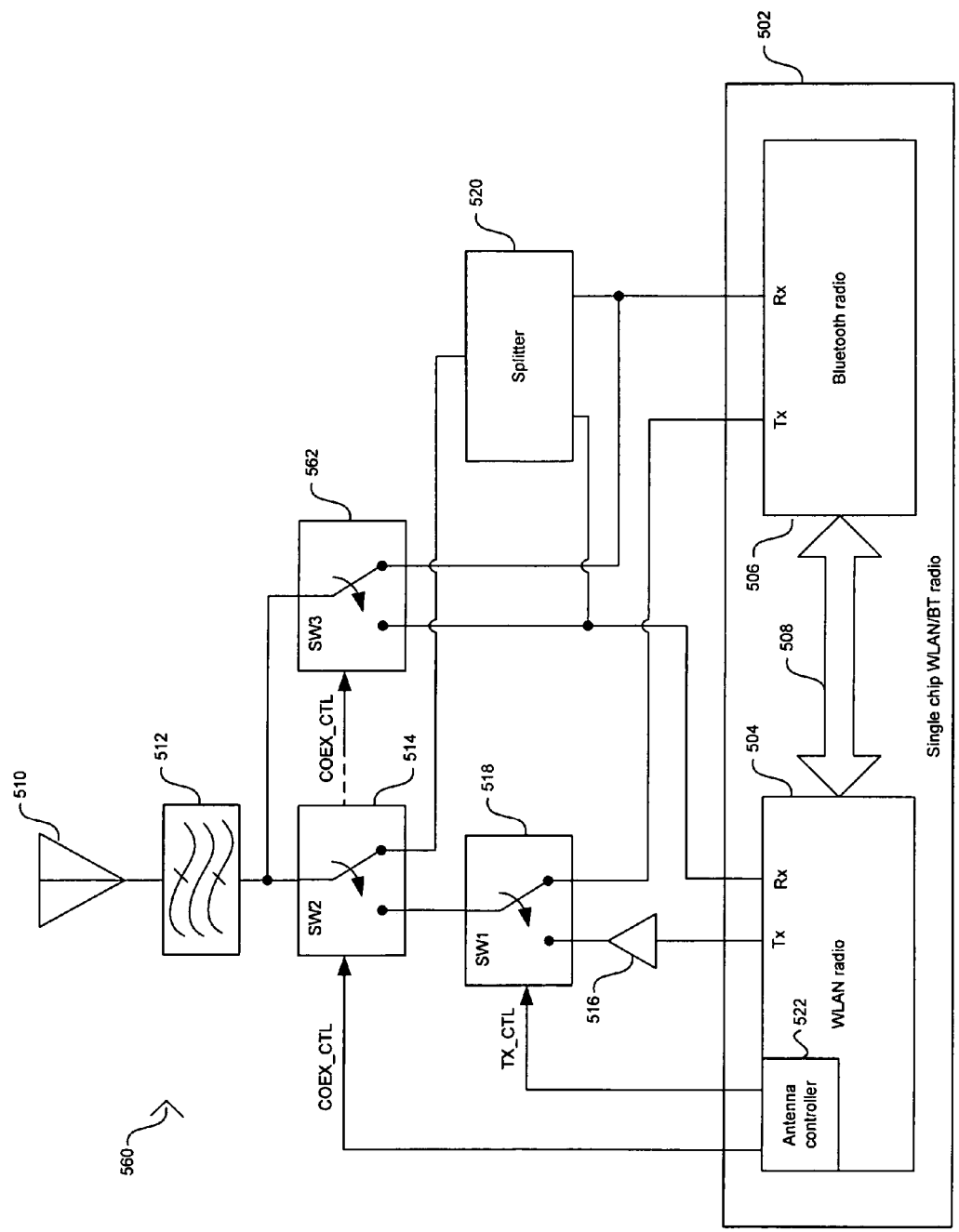
FIG. 5C is a block diagram illustrating an exemplary usage model for the single IC that supports WLAN and Bluetooth radio operations with one antenna utilizing three antenna switches, in accordance with an embodiment of the invention.

FIG. 5C is a block diagram illustrating an exemplary usage model for the single IC that supports WLAN and Bluetooth radio operations with one antenna utilizing three antenna switches, in accordance with an embodiment of the invention. Referring to FIG. 5C, there is shown a WLAN/Bluetooth collaborative radio architecture 560 that may differ from the WLAN/Bluetooth collaborative radio architecture 500 in FIG. 5A in that a third antenna switch (SW3) 562 may be utilized to bypass the SW1 518 and the splitter 520 when receiving both WLAN and BT communication respectively. In this regard, the COEX_CTL signal generated by the antenna controller 522 may also be utilized to control the operation of the SW3 562. Bypassing the splitter 520 may be enabled when WLAN communication is active in order to avoid the signal strength loss through the splitter 520.

In some instances, when there is no Bluetooth traffic, the COEX_CTL signal may be utilized to bypass the splitter 520 and increase the SNR or range of the WLAN communication. Because the splitter 520 may account for approximately about 3 dB in signal reduction, and in some instances, a 1 or 2 dB implementation loss, bypassing the splitter 520 by utilizing the SW3 562 may result in the desired increase in SNR. Similarly, the splitter 520 may be bypassed when there is no WLAN traffic. In most instances, however, a Bluetooth signal loss introduced by the splitter 520 may be tolerated for Bluetooth communication operations.

The radio receiver front-end topology described herein for a single chip WLAN/BT radio device may enable the use of antenna diversity operations to improve SNR or SINR during WLAN reception. Moreover, the front-end topology may also support single antenna configurations when size and/or form factor are of concern.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:

processing, by a baseband processor within a chip, a first wireless local area network (WLAN) radio frequency (RF) signal received via a Bluetooth radio front-end processing circuitry that is separate from, and collocated with, the baseband processor within the chip, wherein the received first WLAN RF signal is mixed by a mixer of the Bluetooth radio front-end processing circuitry;

receiving a second WLAN RF signal via a WLAN processing circuitry integrated within the chip; and combining, within the chip, the first WLAN RF signal received via the Bluetooth radio front-end processing circuitry collocated within the chip and the second WLAN RF signal received via the WLAN processing circuitry integrated within the chip.

2. The method according to claim 1, further comprising combining, within the chip, the first WLAN RF signal received via the Bluetooth radio front-end processing circuitry collocated within the chip and the second WLAN RE signal received via the WLAN processing circuitry integrated within the chip utilizing an maximal ratio combiner (MRC) operation.

3. The method according to claim 1, further comprising combining, within the chip, the first WLAN RF signal received via the Bluetooth radio front-end processing circuitry collocated within the chip and the second WLAN RF signal received via the WLAN processing circuitry integrated within the chip utilizing an antenna selection gain diversity operation.

4. The method according to claim 1, further comprising filtering, within the chip, the first WLAN RF signal received is the Bluetooth radio front-end processing circuitry collocated within the chip before the combining.

5. The method according to claim 1, further comprising filtering, within the chip, the second WLAN RF signal received via the WLAN processing circuitry integrated within the chip before the combining.

6. The method of claim 1, further comprising:
receiving, via a Bluetooth radio front-end processing circuitry, a Bluetooth RF signal.

7. The method of claim 1, wherein the first WLAN RF signal is dropped from the combining when the first WLAN RF signal drops below a threshold value.

8. A non-transitory computer readable medium having stored thereon, a computer program having at least one code section for providing wireless communication, the at least one code section being executable by a processor for causing the processor to perform steps comprising:

processing, within a chip, a first wireless local area network (WLAN) RF signal received via a Bluetooth radio front-end processing circuitry and mixed via a mixer of the Bluetooth radio front-end processing circuitry, the Bluetooth radio front-end processing circuitry being collocated with and separate from, the processor within the chip;

receiving a second WLAN RF signal via a WLAN processing circuitry integrated within the chip; and combining, within the chip, first WLAN RF signal received via the Bluetooth radio front-end processing circuitry collocated within the chip and the second WLAN RF signal received via the WLAN processing circuitry integrated within the chip.

9. The non-transitory computer readable medium according to claim 8, further comprising code for combining, within the chip, the first WLAN RF signal received via the Bluetooth radio front-end processing circuitry collocated within the chip and the second WLAN RF signal received via the WLAN processing circuitry integrated within the chip utilizing an maximal ratio combiner (MRC) operation.

10. The non-transitory computer readable medium according to claim 8, further comprising code for combining, within the chip, the first WLAN RF signal received via the Bluetooth radio front-end processing circuitry collocated within the chip and the second WLAN RF signal received via the WLAN processing circuitry integrated within the chip utilizing an antenna selection gain diversity operation.

11. The non-transitory computer readable medium according to claim 8, further comprising code for filtering, within the chip, the first WLAN RF signal received via the Bluetooth radio front-end processing circuitry collocated within the chip before the combining.

12. The computer readable medium according to claim 8, further comprising code for filtering, within the chip, the second WLAN RF signal received via the WLAN processing circuitry integrated within the chip before the combining.

13. The non-transitory computer readable medium of claim 8, wherein the steps further comprise:
receiving, via a Bluetooth radio front-end processing circuitry, a Bluetooth RF signal.

14. The non-transitory computer readable medium 8, wherein the first WLAN RE signal is dropped from the combining when the first WLAN RE signal drops below a threshold value.

15. A system for providing wireless communication, the system comprising:

a Bluetooth radio front-end processing circuitry comprising a mixer collocated within a chip, the Bluetooth radio front-end processing circuitry configured to:
process a received first wireless local area network (WLAN) radio frequency (RF) signal by at least mixing the received first WLAN RE signal using the mixer;

WLAN processing circuitry integrated within the chip, the WLAN processing circuitry configured to receive a second WLAN RE signal; and circuitry within the chip that is configured to combine the first WLAN RF signal received via the Bluetooth radio front-end processing circuitry collocated within the chip and the second WLAN RF signal received via the WLAN processing circuitry integrated within the chip.

16. The system according to claim 15, wherein the circuitry within the chip is further configured to combine the first WLAN RF signal received via the Bluetooth radio front-end processing circuitry collocated within the chip and the second WLAN RF signal received via the WLAN processing circuitry integrated within the chip utilizing an maximal ratio combiner (MRC) operation.

17. The system according to claim 15, wherein the circuitry within the chip is further configured to combine the first WLAN RF signal received via the Bluetooth radio front-end processing circuitry collocated within the chip and the second WLAN RF signal received via the WLAN processing circuitry integrated within the chip utilizing an antenna selection gain diversity operation.

18. The system according to claim 15, wherein the circuitry within the chip is further configured to filter the first WLAN RF signal received via the Bluetooth radio front-end processing circuitry collocated within the chip before the combining.

19. The system according to claim 15, wherein the circuitry within the chip is further configured to filter the second WLAN RF signal received via the WLAN processing circuitry integrated within the chip before the combining.

20. The system of claim 15, wherein the Bluetooth radio front-end processing circuitry is further configured to:
receiving, via a Bluetooth radio front-end processing circuitry, a Bluetooth RF signal.

21. The system of claim 15, wherein the first WLAN RF signal is dropped from the combining when the first WLAN RF signal drops below a threshold value.

* * * * *